(12) United States Patent
McDermott et al.

(10) Patent No.: US 7,637,631 B2
(45) Date of Patent: Dec. 29, 2009

(54) NON-CONTACT DEAD FRONT ACTUATION SYSTEM AND LIGHTING ASSEMBLY FOR PROVIDING KEYLESS ENTRY INTO A PASSENGER COMPARTMENT OF A MOTOR VEHICLE

(75) Inventors: Daniel T. McDermott, Grand Blanc, MI (US); Steven R. Giles, Troy, MI (US); Sean E. Granger, Detroit, MI (US)

(73) Assignee: Magna International, Inc., Aurora (CA)

( * ) Notice: Subject to any disclaimer, the term of this patent is extended or adjusted under 35 U.S.C. 154(b) by 110 days.

(21) Appl. No.: 11/805,939

(22) Filed: May 24, 2007

(65) Prior Publication Data
US 2007/0295043 A1 Dec. 27, 2007

Related U.S. Application Data

(63) Continuation-in-part of application No. PCT/US2005/043824, filed on Dec. 5, 2005.

(60) Provisional application No. 60/633,049, filed on Dec. 3, 2004.

(51) Int. Cl.
*F21V 23/04* (2006.01)
(52) U.S. Cl. .................... 362/276; 362/501; 362/545; 362/802
(58) Field of Classification Search .............. 362/276, 362/464, 84–85, 501, 394, 802, 100, 95, 362/411, 311, 545; 200/314, 317; 70/255; 345/156, 173; 307/10.3–10.5, 10.8
See application file for complete search history.

(56) References Cited

U.S. PATENT DOCUMENTS 4,205,325 A   5/1980  Haygood et al.
5,434,757 A * 7/1995  Kashiwagi .................. 362/501
5,467,080 A  11/1995  Stoll et al.
6,288,652 B1  9/2001  Bedi et al.
6,727,800 B1  4/2004  Dutu
6,789,003 B2  9/2004  Magner et al.
6,897,390 B2  5/2005  Caldwell et al.
2003/0031025 A1* 2/2003 Huizenga ................... 362/501
2004/0027238 A1  2/2004  Magner et al.
2004/0233677 A1* 11/2004  Su et al. ..................... 362/501
2004/0247363 A1* 12/2004  Kaufman et al. ............ 400/472

FOREIGN PATENT DOCUMENTS

WO   WO 2006060745 A2 *  6/2006

\* cited by examiner

*Primary Examiner*—Anabel Ton
*Assistant Examiner*—Kevin J. Spinella
(74) *Attorney, Agent, or Firm*—Warn Partners, P.C.; Marc Luddy

(57) ABSTRACT

A dead front actuating assembly actuates a device in standard ambient light conditions. The dead front actuating assembly includes a housing defining a periphery and an interior volume. A cover plate is fixedly secured to the housing at the periphery. The cover plate defines an inboard surface facing the interior volume and an outboard surface opposite the inboard surface. The outboard surface is opaque in standard ambient light conditions. The dead front actuating assembly also includes a switch that is operatively connected to the inboard surface of the cover plate at a defined location for toggling the device between on and off conditions. Also included is a presence sensor identifying when an operator is disposed adjacent the cover plate. A back light inside the housing illuminates the cover plate such that light passes through the cover plate and out the outboard surface to illuminate the switch.

7 Claims, 4 Drawing Sheets

NON-CONTACT DEAD FRONT ACTUATION SYSTEM AND LIGHTING ASSEMBLY FOR PROVIDING KEYLESS ENTRY INTO A PASSENGER COMPARTMENT OF A MOTOR VEHICLE

CROSS-REFERENCE TO RELATED APPLICATIONS

This application is a continuation-in-part application of International Application No. PCT/US2005/043824 filed Dec. 5, 2005, entitled Non-Contact Dead Front Actuation System, which claims priority to U.S. Patent Application No. 60/633,049 filed on Dec. 3, 2004. The disclosures of the above applications are incorporated herein by reference.

FIELD OF THE INVENTION

The invention relates to a dead front actuating assembly for a motor vehicle. More particularly, the invention relates to a contact/non-contact dead front actuating assembly that is not visible in its deactivated state.

BACKGROUND OF THE INVENTION

A feature in a motor vehicle that is desired and often times designed therein is the ability to quickly and effortlessly gain access to the passenger compartment of the motor vehicle. In addition to the standard metal key, many passenger compartments can be unlocked using a key fob coded for that specific motor vehicle. In an effort to gain further freedom from a physical item which must be carried to the motor vehicle, some motor vehicles are manufactured with outside key pads. The key pads are typically digital combination locks that provide access to the passenger compartment if the correct combination is input through the key pad.

While the key pad adds to the freedom of an operator's ability to access the motor vehicle, it interrupts the design of the motor vehicle. More specifically, it is difficult to provide a key pad of much substance without detracting from the overall design of the motor vehicle. Therefore, key pads are kept to a minimum size and functionality due to the limited size. Thus, the key pad remains an inferior option in a motor vehicle because, even with the limited size and functionality, it still disrupts the overall appearance of the motor vehicle.

SUMMARY OF THE INVENTION

A dead front actuating assembly actuates a device in standard ambient light conditions. The dead front actuating assembly includes a housing defining a periphery and an interior volume. A cover plate is fixedly secured to the housing at the periphery. The cover plate defines an inboard surface facing the interior volume and an outboard surface opposite the inboard surface. The outboard surface is opaque in standard ambient light conditions. The dead front actuating assembly also includes a switch that is operatively connected to the inboard surface of the cover plate at a defined location for toggling the device between on and off conditions. The dead front actuating assembly also includes a presence sensor identifying when an operator is disposed adjacent the cover plate. A back light inside the housing illuminates the cover plate such that light passes through the cover plate and out the outboard surface to illuminate the switch for the operator.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
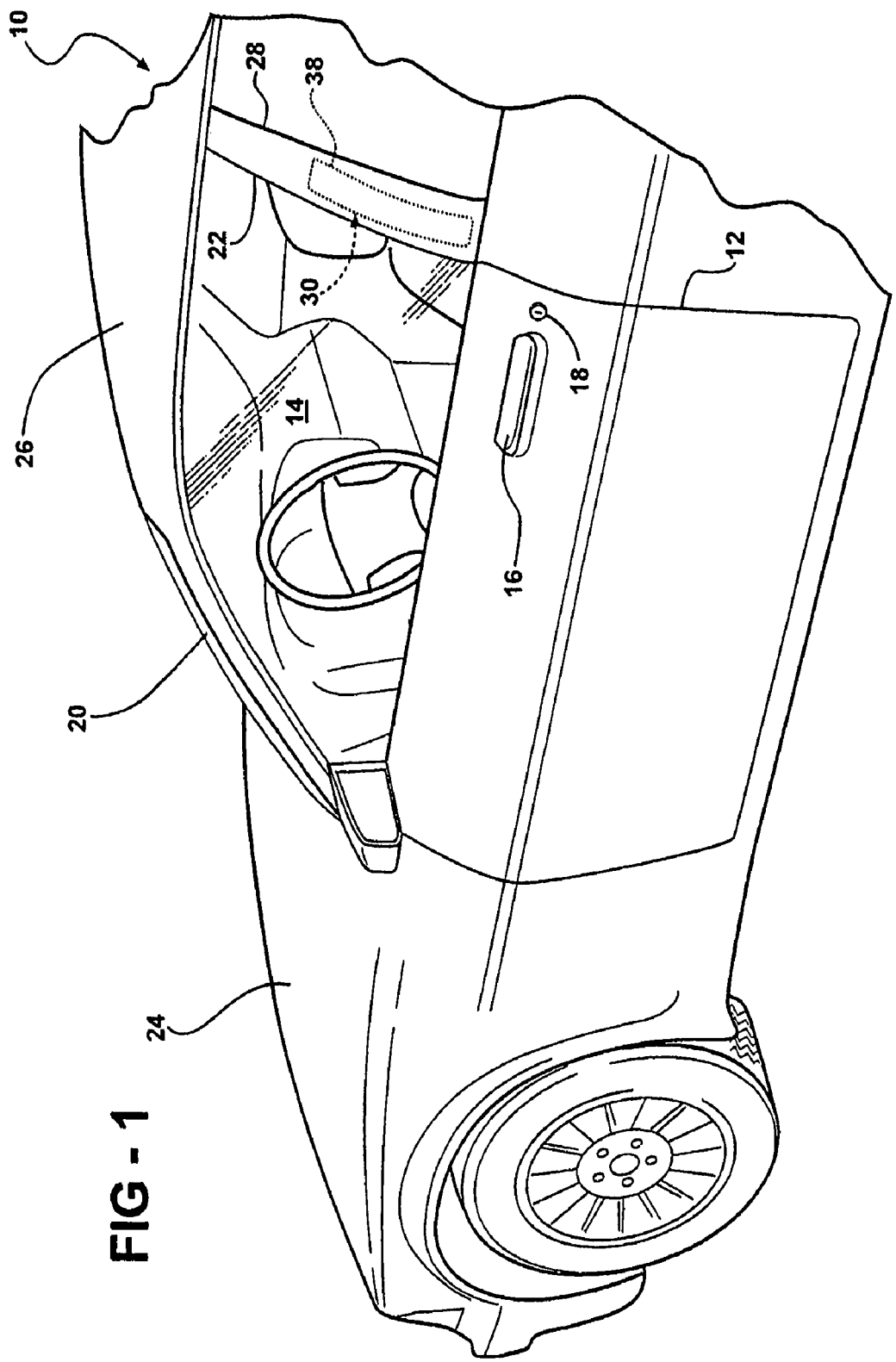
FIG. 1 is a side view of a motor vehicle incorporating one embodiment of the invention.

Referring to FIG. 1, a side view of a motor vehicle 10 is shown partially cut away. The motor vehicle has a side door 12 that provides access to a passenger compartment 14 of the motor vehicle 10. This side door 12 includes a door handle 16 and a key hole 18 for standard locking and unlocking using a key (not shown).

The motor vehicle 10 also includes an A pillar 20 and a B pillar 22 extending up from a main body 24 of the motor vehicle to a roof 26.

In the embodiment shown in FIG. 1, the B pillar 22 is covered by a cover plate 28. The cover plate 28 is a tinted black or dark color polycarbonate, lexan, lucite, ABS, nylon, polyethylene, polypropylene, acrylic or copolymers thereof. These materials are treated to appear dark or black in standard ambient light conditions but allow transparency during back lighting. For purposes of this disclosure, standard ambient light conditions include any type of outdoor lighting or the lack thereof. Therefore, the cover plate 28 appears opaque in sunlight, darkness, and artificial, non-coherent light sources, which are typically used to provide lighting in darkness. The cover plate 28 covers the B pillar 22 and adds to the overall aesthetic design of the motor vehicle 10. More specifically, the cover plate 28 is used as a part of the overall design of the exterior of the motor vehicle 10.

The cover plate 28 may cover a portion of the B pillar 22 or it may cover the entire B pillar 22. The composition of the cover plate 28 allows the cover plate 28 to act as a "dead front" in that it is opaque with respect to electromagnetic radiation in the visible portion of the spectrum of electromagnetic radiation, but transparent with respect to the radio frequency portion of the spectrum. In addition, the dead front cover plate 28 is transparent to magnetic radiation as will be discussed in greater detail subsequently. While tinted black or dark color transparent polymers are disclosed above, any type of material which at least partially or fully hides a key pad in ambient light but renders a key pad visible through back lighting or other methods is useable in the present invention. For instance, mirrored or metallized films or materials, frosted or tinted glass, electrochromic materials or other changeable films or surfaces which are, or can be rendered, opaque under ambient light but allow viewing of the key pad when desired are also useful as cover plate 28 in the subject invention.

The cover plate 28 covers a dead front actuating assembly, generally indicated at 30, and shown in phantom in FIG. 1. The dead front actuating assembly 30 is an assembly that allows for the side door 12 to be unlatched and opened without utilizing a key fob entry or a manual key, which is inserted into the key hole 18. Like the key fob actuation, the dead front actuating assembly 30 is commonly referred to as a type of keyless entry. While the dead front actuating assembly 30 is described herein as a keyless entry system, it should be appreciated by those skilled in the art that the dead front actuating assembly 30 may be utilized for any type of system that requires actuation. Such systems may include, but are not limited to, the unlocking of tailgates and liftgates, the activation of appropriate illuminating switches, and the activation or deactivation of any other electronic component incorporated into the motor vehicle 10.

Because the cover plate 28 covers the dead front actuating assembly 30, the cover plate 28 provides the dead front feature thereof. More specifically, the cover plate 28 can look like nothing is behind it when the dead front actuating assembly 30 is deactivated.

Further to the location diversity, the dead front actuating assembly 30 may be placed includes any pillar, driver or passenger side, or any surface that is capable of having a polycarbonate, acrylic or similar construction with the little space therebehind for the dead front actuating assembly 30 to be mounted. The location may be on the exterior of the motor vehicle 10, the inside of the passenger compartment 14, or inside an engine storage compartment. The dead front actuation assembly 30 described herein could also be used in a number of vehicle interior applications where a completely sealed surface is advantageous or desired, such as door switches (to avoid penetration of the switch box by rain or other external moisture), and center consoles next to cup holders. Another type of use would be to use the non-contact dead front actuating assembly 30 to activate and make itself visible when it is detected that a passenger has occupied a seat.

Figure 3:
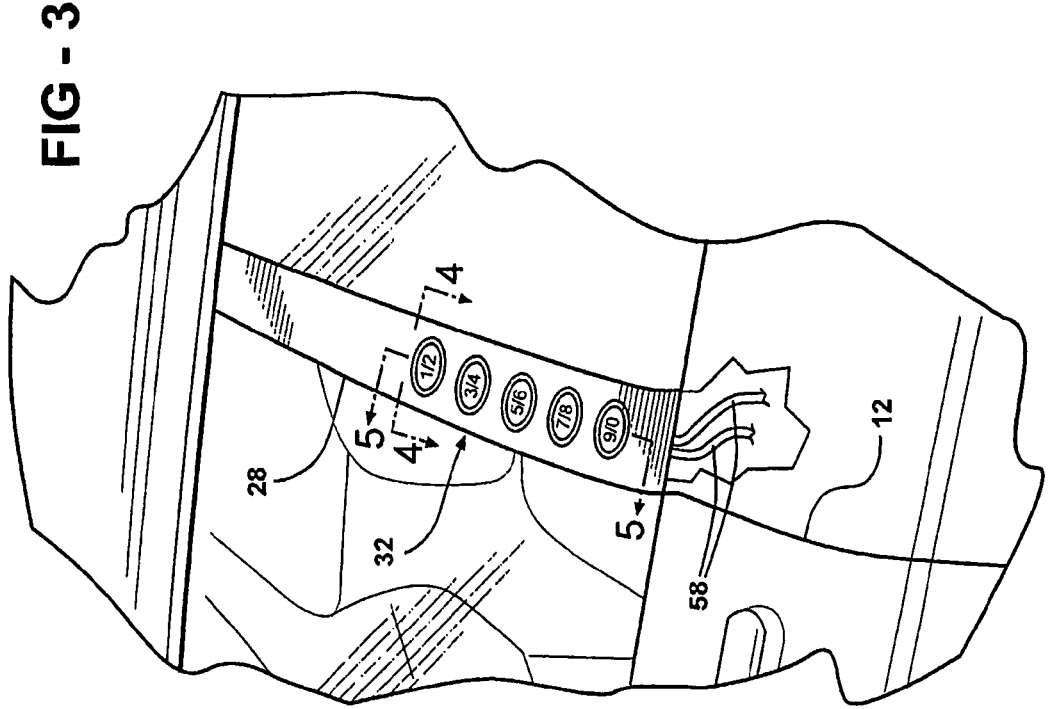
FIG. 3 is a side view of the invention in an activated state.
Figure 2:
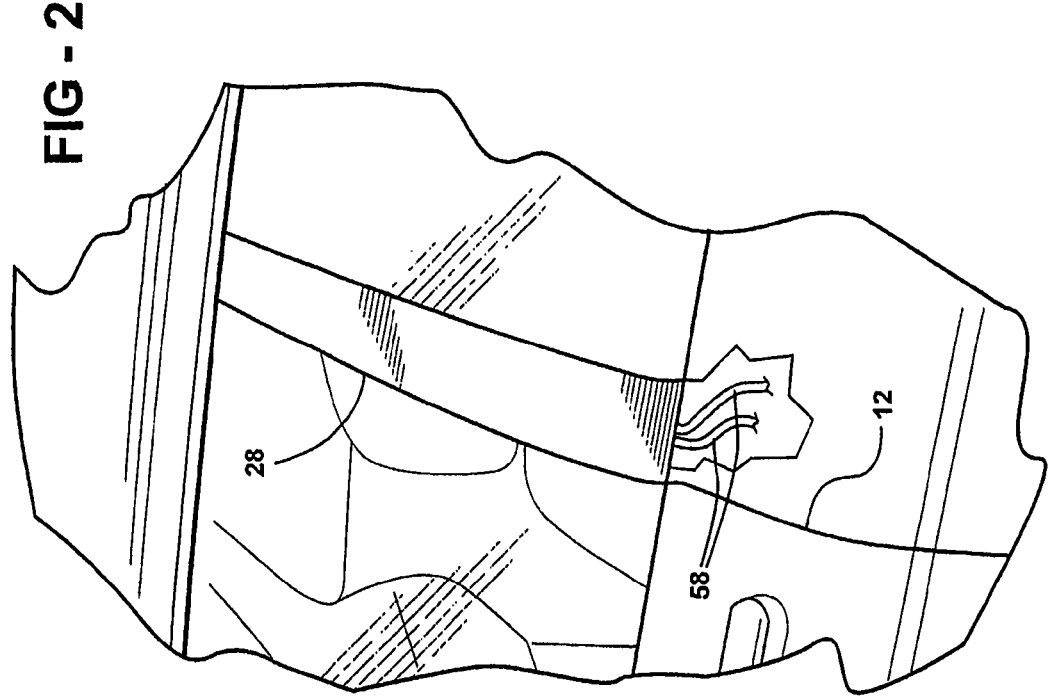
FIG. 2 is a side view of the invention in a deactivated state.

Referring to FIGS. 2 and 3, the cover plate 28 is shown with the dead front actuating assembly 30 deactivated and activated, respectively. In the deactivated state, the dead front actuating assembly 30 is invisible due to the opaque nature of the cover plate 28 (FIGS. 1 and 2). In the activated state (FIG. 3), a key pad 32 is illuminated and visible through the cover plate 28. In the embodiment shown, the key pad 32 includes a plurality of switches 34 that are used in a random combination to unlock the latch of the side door 12. It should be appreciated by those skilled in the art that the key pad 32 and the dead front actuating assembly 30 may also be used to lock the side door 12 preventing access to the passenger compartment 14.

Figure 4:
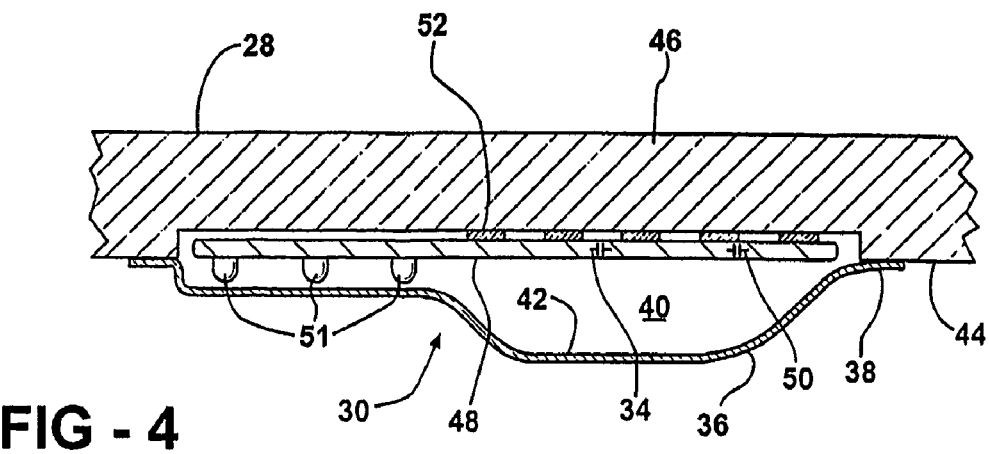
FIG. 4 is a top, cross-sectional view of the invention taken along lines 4-4 of FIG. 3.

Referring to FIG. 4, a top view of the dead front actuating assembly 30 is shown with the cover plate 28 in cross section. The dead front actuating assembly 30 includes a housing 36 that defines a periphery 38 (best shown in FIG. 1) and an interior volume 40. The housing 36 is fixedly secured to the cover plate 28 at the periphery 38. The housing includes a reflective surface 42 designed to reflect as much light generated by the non-contact dead front actuating assembly 30 away therefrom and toward the cover plate 28.

The cover plate 28 defines an inboard surface 44 and an outboard surface 46. The inboard surface 44 is fixedly secured to the motor vehicle 10, whereas the outboard surface 46 is visible to those outside the motor vehicle 10. Therefore, the inboard surface 44 faces the interior volume 40 and the outboard surface 46 is opposite the inboard surface 44 and it is the outboard surface 46 that appears to be opaque to those standing outside the motor vehicle 10 in standard ambient light conditions. The switches 34 are operatively connected to the cover plate 28. The switches 34 are mounted to a plate 48 and are touch sensitive. More specifically, each of the plurality of switches 34 are activated by touching the cover plate 28 in direct proximity to the specific switch 34 being "pressed" or activated. The switches 34 are sensors that detect a change in the capacitance of the cover plate 28 in direct proximity to the location of the particular switch 34.

The dead front actuating assembly 30 also includes a presence sensor 50. The presence sensor 50 identifies when an operator is disposed adjacent the cover plate 28. In the embodiment shown, the presence sensor 50 is a touch sensor that is integrated into the plate 48 in which the plurality of switches 34 are located. In an alternative embodiment, the presence sensor 50 may be mounted to a circuit board and identifies when the operator of the motor vehicle 10 approaches. Such a presence sensor 50 may be a transceiver that sends a signal to ping a key fob (not shown) to identify when the key fob enters the space in immediate proximity to the dead front actuating assembly 30, the plurality of switches 34 are illuminated by the dead front actuating assembly 30.

The presence sensor 50 and the plurality of switches 34 may, in some embodiments, be the same type of sensors. In fact, activating one of the plurality of switches 34 through a touch may act as the presence sensor 50 to activate the non-contact dead front actuating assembly 30. In other instances, the presence sensor 50 and the plurality of switches may be designed to be capacitive sensors, touch sensitive sensors, resistive sensors, temperature sensors, optical scanners or any combination thereof.

Returning our attention to the preferred embodiment, when the presence sensor 50 identifies the action by the operator of touching the cover plate 28, a back light inside the housing 36 illuminates the cover plate 28 such that light passes through the cover plate 28 and out the outboard surface 46 to illuminate the location of the plurality of switches 34 for the operator. The back light is generated by a light emitting diode 51. As is shown in the embodiment, there are three light emitting diodes (LEDs) 51. It should be appreciated that any number of LEDs 51 may be used to satisfy the illumination requirements to allow an operator to identify the location of the switches 34. The LEDs 51 direct light toward the interior volume 40 of the housing 36 to be reflected by the reflective surface 42 toward the inboard surface 44 of the cover plate 28. Eventually, the light passes through the plate 48 and the cover plate 28 to be viewed by the operator as modified by a layer of graphics 52. The switches 34 and presence sensor 50 are fabricated from electronics that are not, by design, readily visible to the operator. Therefore, the layer of graphics 52 is used to identify the location of each of these switches 34. The graphics 52 are not operative in and of themselves, but merely targets used to allow the operator to identify where each of the plurality of switches 34 are located to more accurately and efficiently operate the dead front actuating assembly 30. It is the targets that are visible in FIG. 3. In an alternative embodiment, there are no graphics and the switches 34 are visible through the back lighting in a manner visible to the operator for selection thereby.

It should be appreciated that the back light source and delivery mechanism may be any type of light source 51 that will be able to be incorporated that can overcome opaque qualities of the cover plate 28. Such examples of light source for the back light 51 include, but are not limited to, sources that generate light through fluorescent, filament, phosphorescent or laser elements. Fiber optics and/or wave guides may direct the light should the source for the back light need to be in a different location.

Figure 5:
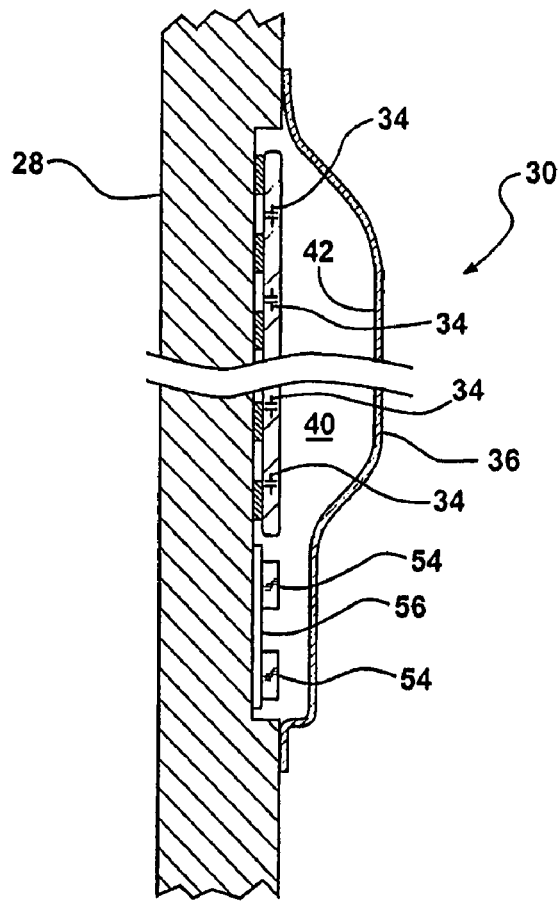
FIG. 5 is a side, cross-sectional view of the invention taken along lines 5-5 of FIG. 3.

Referring to FIG. 5, the dead front actuating assembly is shown in a side view. Connectors 54, mounted to an integrated circuit board 56, connect the dead front actuating assembly 30 to the electronics of the motor vehicle 10 through wires 58 (FIGS. 3 and 4) to receive power and to communicate with latching assembly associated with the side door 12 to identify when it is appropriate to unlock the side door 12. The integrated circuit board 56 includes electronics known in the art for providing exterior combination locks that incorporate the traditional numeric keypad. In addition, the integrated circuit board 56 includes electronics suitable for providing the necessary voltage to the plurality of switches 34 so the capacitances and changes therewith may be detected. Such changes in capacitance occur when an operator places a finger on the cover plate 28 on or near the location of one of the plurality of switches 34. When the capacitance changes, the electronics on the integrated circuit board 56 identify the capacitance change as a selection of a particular location which is identified by the graphics 52. In this particular case, the graphics 52 typically represent letters or numbers (as is shown in FIG. 3). When the selections are made in the right combination, the electronics send a signal through the connectors 54 and the wires 58 to have the side door 12 unlatched by the door latch (not shown).

Figure 6:
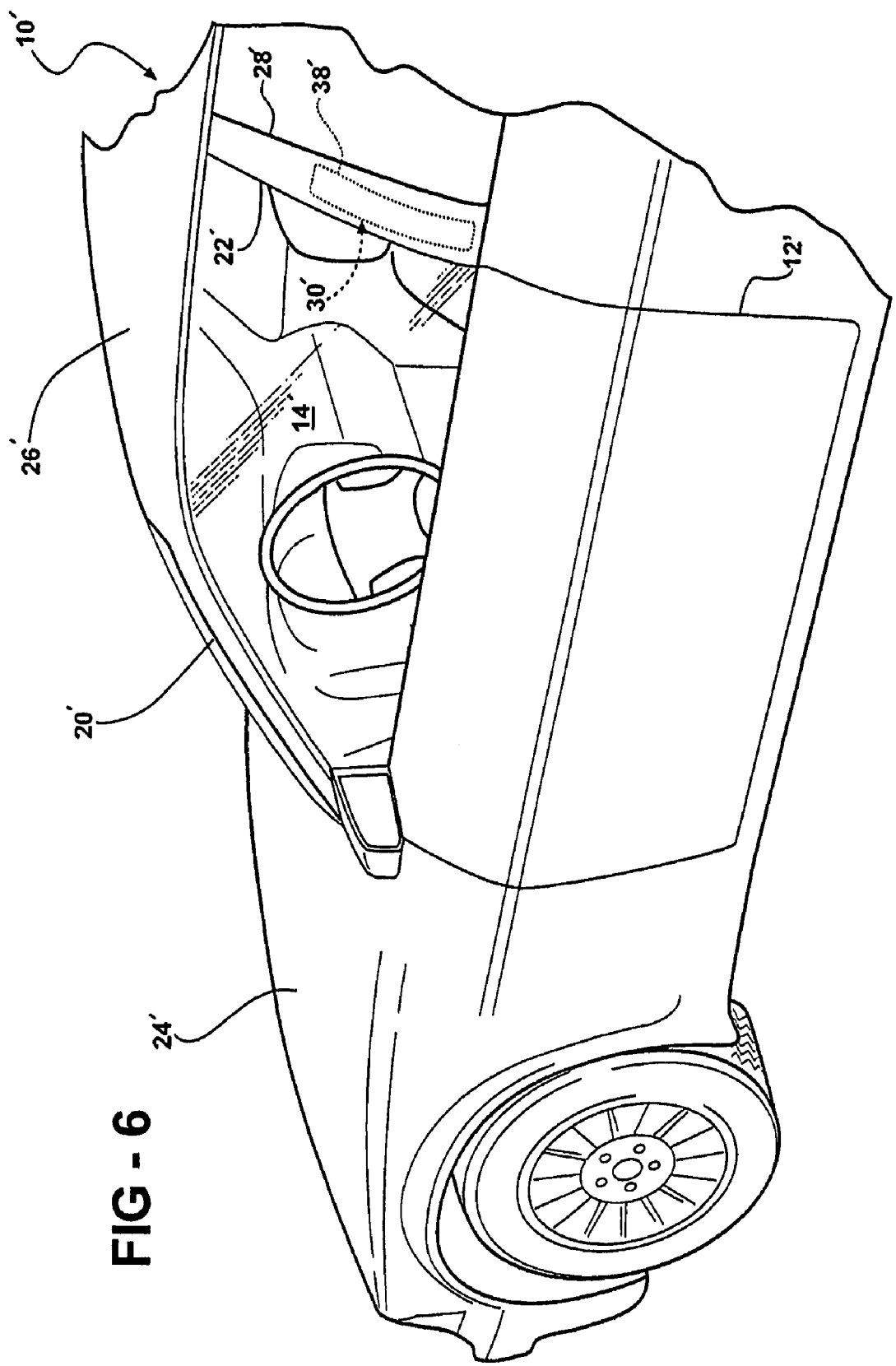
FIG. 6 is a side view of a motor vehicle incorporating the invention that provides additional functionality.

Referring to FIG. 6, wherein like primed numerals represent similar elements to those discussed above, another embodiment is shown. The motor vehicle 10' does not include a door handle or key hole. This motor vehicle 10' utilizes a dead front actuating assembly 30' that can perform multiple functions, e.g. unlock and unlatch the side door 12'. This allows the design of the motor vehicle 10' to be further unencumbered by functional features that detract from the aesthetic qualities of the motor vehicle 10'.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A dead front actuating assembly for providing a keyless entry into a passenger compartment of a motor vehicle by unlocking a lock of a door of the motor vehicle, said dead front actuating assembly comprising:
   a housing defining a periphery and an interior volume;
   a cover plate fixedly secured to said housing at said periphery, said cover plate defining an inboard surface facing said interior volume and an outboard surface opposite said inboard surface, said outboard surface forming a dead front surface which is opaque in the standard ambient light conditions and transparent during back lighting conditions;
   a plurality of switches operatively connected to said cover plate for locking and unlocking the lock of the motor vehicle, said plurality of switches being connected to said cover plate such that said plurality of switches are hidden by said dead front surface in standard ambient lighting conditions;
   a touch sensor identifying when an operator touches said cover plate; and
   a plurality of back lights inside said housing to illuminate said cover plate in response to a signal from said touch sensor such that light passes through said cover plate and out said outboard surface to illuminate said plurality of switches, making said plurality of switches visible to said operator and allowing the operator to select a combination of the plurality of switches to lock and unlock the motor vehicle.

2. A dead front actuating assembly as set forth in claim 1, including a graphics template fixedly secured to said inboard surface to graphically identify said switch when said plurality of back lights are is on.

3. A dead front actuating assembly as set forth in claim 1, wherein said switch and said graphics template are not visible when said plurality of back lights are is off.

4. A dead front actuating assembly as set forth in claim 1, wherein said housing includes a reflective surface to reflect most of the light emitted from said plurality back lights at said cover plate.

5. A dead front actuating assembly as set forth in claim 1, wherein said plurality of back lights are is a light emitting diodes.

6. A dead front actuating assembly as set forth in claim 1, wherein said touch sensor extends across an area defined by said periphery of said housing.

7. The dead front actuating assembly of claim 1, wherein said cover plate is made from a material selected from the group consisting of: lexan, lucite, ABS, nylon, polyethylene, polypropylene, mixture blends and copolymers thereof, a metallized film or material, glass, an electrochromic film or material, and combinations thereof.

* * * * *